United States Patent
Jubran et al.

(10) Patent No.: US 9,286,043 B2
(45) Date of Patent: Mar. 15, 2016

(54) SOFTWARE BUILD OPTIMIZATION

(71) Applicant: Microsoft Corporation, Redmond, WA (US)

(72) Inventors: Marwan E. Jubran, Redmond, WA (US); Aleksandr Gershaft, Redmond, WA (US); Vladimir Petrenko, Redmond, WA (US); Igor Avramovic, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 131 days.

(21) Appl. No.: 13/841,241

(22) Filed: Mar. 15, 2013

(65) Prior Publication Data
US 2014/0282450 A1   Sep. 18, 2014

(51) Int. Cl.
*G06F 9/44* (2006.01)
*G06F 9/45* (2006.01)

(52) U.S. Cl.
CPC . *G06F 8/443* (2013.01); *G06F 8/71* (2013.01)

(58) Field of Classification Search
CPC ..................................................... G06F 8/443
See application file for complete search history.

(56) References Cited

U.S. PATENT DOCUMENTS 5,339,435 A * 8/1994 Lubkin et al. ................. 717/121
5,500,881 A * 3/1996 Levin et al. ................... 717/141

(Continued)

FOREIGN PATENT DOCUMENTS

WO           0104746 A1      1/2001

OTHER PUBLICATIONS

Umut A. Acar, Guy E. Blelloch, Matthias Blume, Robert Harper, and Kanat Tangwongsan. 2009. An experimental analysis of self-adjusting computation. ACM Trans. Program. Lang. Syst. 32, 1, Article 3 (Nov. 2009), 53 pages. DOI=10.1145/1596527.1596530 http://doi.acm.org/10.1145/1596527.1596530.*

(Continued)

*Primary Examiner* — James D Rutten
(74) *Attorney, Agent, or Firm* — Ben Tabor; Kate Drakos; Micky Minhas

(57) ABSTRACT

A method for optimization of a software build includes collecting first data representative of inputs for a build process obtained by a set of data accessing operations implemented during a first execution of the build process, the set including a file accessing operation and a non-file accessing operation. A redirection routine embedded within the build process captures the inputs. The first data is compared with second data representative of the inputs obtained in connection with a second execution of the build process. If the first and second data do not match, the second data is recorded in a data store and output data generated by the second execution of the build process is stored. If the first and second data match, output data generated by the first execution of the build process is used as an output for the second execution of the build process.

18 Claims, 3 Drawing Sheets

(56) References Cited

U.S. PATENT DOCUMENTS

| | | | |
|---|---|---|---|
| 5,748,961 A * | 5/1998 | Hanna et al. | 717/145 |
| 6,298,476 B1 | 10/2001 | Misheski et al. | |
| 6,487,713 B1 * | 11/2002 | Cohen et al. | 717/105 |
| 7,721,272 B2 | 5/2010 | Mockford | |
| 2003/0163799 A1 * | 8/2003 | Vasilik et al. | 717/100 |
| 2005/0039186 A1 * | 2/2005 | Borkan | 719/310 |
| 2006/0036834 A1 | 2/2006 | Maiyuran et al. | |
| 2006/0288261 A1 * | 12/2006 | Yuan et al. | 714/48 |
| 2010/0077387 A1 | 3/2010 | Callaghan et al. | |
| 2011/0239192 A1 | 9/2011 | Feigen | |
| 2012/0079447 A1 | 3/2012 | Arnott et al. | |
| 2012/0260240 A1 | 10/2012 | Arnott et al. | |
| 2013/0055253 A1 | 2/2013 | Jubran et al. | |

OTHER PUBLICATIONS

Hall, et al, "Improving Software Performance with Automatic Memoization", Retrieved at <<http://citeseerx.ist.psu.edu/viewdoc/download?doi=10.1.1.29.9496&rep=rep1&type=pdf>>, in Johns Hopkins API—Technical Digest, vol. 18, No. 2, pp. 254-260, 1997.

"International Search Report & Written Opinion for PCT Patent Application No. PCT/US2014/026941", Mailed Date: Sep. 4, 2014, 9 Pages.

* cited by examiner

SOFTWARE BUILD OPTIMIZATION

BACKGROUND OF THE DISCLOSURE

Brief Description of Related Technology

Computers accomplish tasks by processing sets of instructions derived from software source code. Source code is typically written by a software developer using one or more programming languages. Most programming languages have a source code compiler to compile the source code into computer readable, binary data files, or binaries.

A software build is the process of creating the binaries for a software application. Builds are done periodically during software development to provide binaries to support further work by the software development teams. Software builds involve executing many build tools in addition to the compiler to process the source code files and other input data for the software application. The execution of the build tools is often time intensive, as some software development projects may involve thousands, or even hundreds of thousands, of source code files having a complex dependency structure.

Summary of the Disclosure

Methods, systems, and computer program products are directed to optimizing a software build. Data representative of inputs for a build process is compared with data representative of the inputs for a previous execution of the build process. When a data match occurs, output data generated by the previous execution is used to optimize the software build.

In accordance with one aspect of the disclosure, data representative of inputs obtained by data accessing operations implemented during a first execution of a build process is collected. The inputs are captured via a redirection routine embedded in the build process for execution upon invocation of both file and non-file accessing operations of the build process. The collected data is compared with data representative of the inputs obtained in connection with a second execution of the build process to determine whether output data generated by the first execution may be used for build optimization.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DESCRIPTION OF THE DRAWING FIGURES

For a more complete understanding of the disclosure, reference is made to the following detailed description and accompanying drawing figures, in which like reference numerals may be used to identify like elements in the figures.

Figure 1:
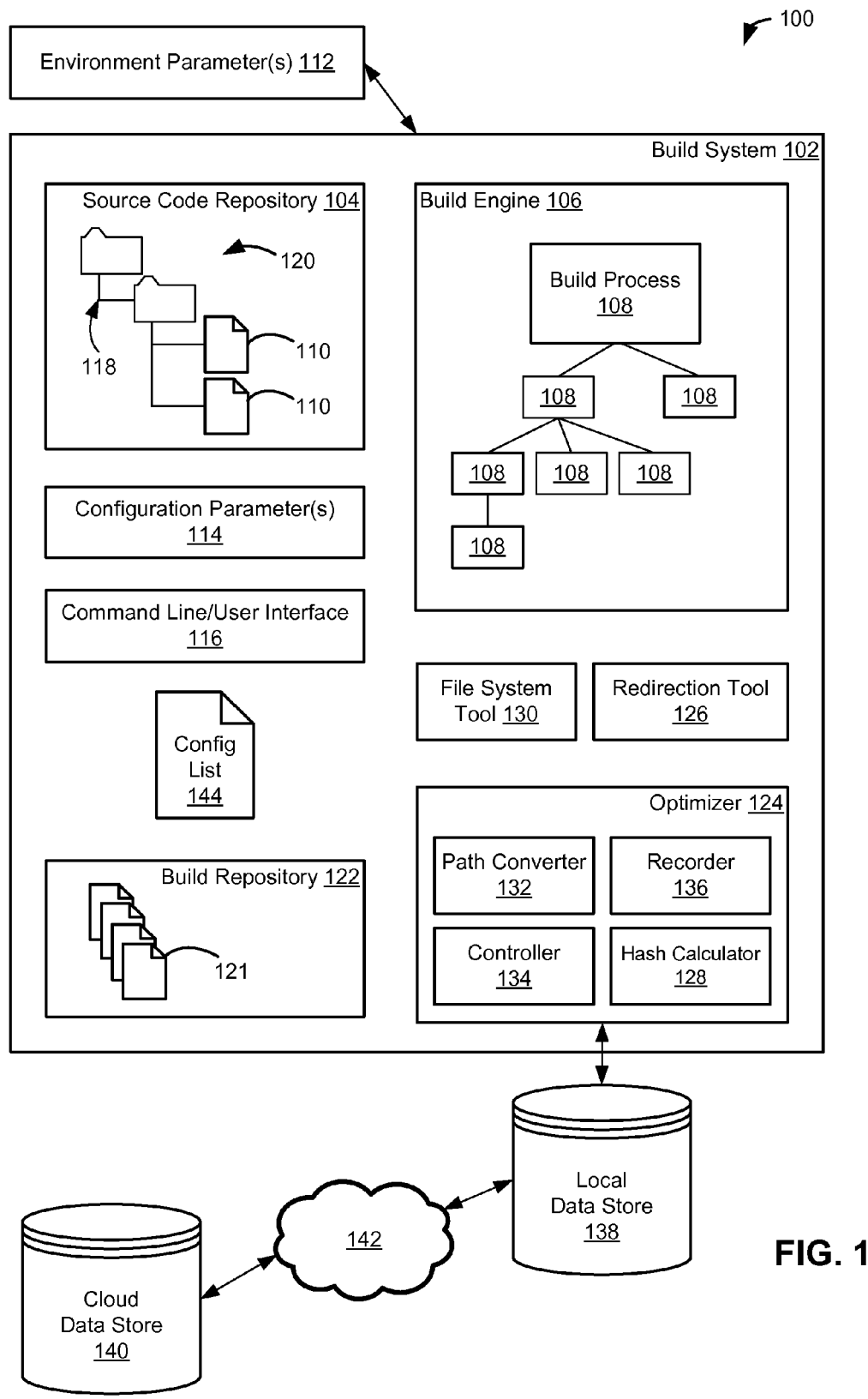
FIG. 1 is a block diagram of an exemplary system configured for optimization of a software build in accordance with one embodiment.

While the disclosed systems and methods are susceptible of embodiments in various forms, specific embodiments are illustrated in the drawing (and are hereafter described), with the understanding that the disclosure is intended to be illustrative, and is not intended to limit the invention to the specific embodiments described and illustrated herein.

DETAILED DESCRIPTION

Methods, systems, and computer program products are described for optimization of a software build, such as a source code build. The optimization is achieved using output data generated by previous executions of build processes of the source code build. Such use of previous output data may be appropriate if inputs to a build process have not changed from the previous execution. An incremental build involving only a fraction of the build processes may thus be implemented to optimize the source code build. Such optimization may result in a more efficient build, in which the output or results of the build are available more quickly. The type of optimization provided by relying on previous build results to avoid unnecessary execution of build processes may be referred to as build "memorization," or "trimming" of the build processes.

A build may be tracked as an event graph or sequence of processes that take in a set of inputs and produce a set of outputs. Using data representative of the inputs at each level, stage, or event of the build, a decision may be made whether to execute the process or use a previously cached, archived, or otherwise stored output result instead. With each new build, if the inputs to a build process are the same as a previous execution of the build process, the archived data is copied or used instead of running (or proceeding with the execution of) the build process. Use of such archived data may result in improved build speeds of up to about 60%.

The disclosed embodiments collect data representative of the inputs and implement a comparison with data representative of the inputs for the previous execution of the build process. The inputs are captured via a redirection routine embedded in the build processes. The redirection routine is executed upon invocation of each data accessing operation implemented during execution of the build process. The redirection routine may enable the disclosed embodiments to implement instructions configured to record the inputs gathered by data accessing operations implemented during execution of the build process. In some embodiments, an invocation of a build process is compared with an identity of the build process (e.g., identifiers of the build process and all inputs thereto). If the build process does not match the identities of any previous executions of the build process, the build process is executed, the identity is recorded, and any outputs are stored.

The redirection routine may be inserted automatically into child processes invoked by a root or top build process. The data indicative of the inputs may thus be collected for each build process invoked either directly or indirectly as part of the build. The redirection routine and other aspects of the disclosed embodiments may allow the optimization to be achieved in connection with pre-existing build systems. The disclosed embodiments are not limited to a particular type of build system. The optimizer and/or other components of the disclosed embodiments may be integrated with a variety of different build systems.

The disclosed embodiments are configured to capture various types of inputs obtained by data accessing operations (e.g., function calls) implemented during execution the build process. The data accessing operations include both file accessing operations and non-file accessing operations. The disclosed embodiments are configured to capture the inputs obtained by both of these types of data accessing operations. The disclosed embodiments are thus not limited to comparing source code and other file inputs to the build process. Instead, other inputs to the build process may also be compared, including, for instance, variables or parameters indicative of the computing or build environment in which the build process is executed. The disclosed embodiments may capture the inputs obtained via the non-file accessing operations of the build process despite the varying nature, source, and other characteristics of such inputs.

The comparisons with previous build results of the disclosed embodiments are not limited to determining whether input files, such as source code files, are changed. The disclosed embodiments thus address the possibility that data accessing operations of a build process that obtain data from non-file sources may change the output of the build process. By including such data in the comparison, the decision whether to execute a particular build process may thus be more accurate.

The disclosed embodiments may be configured to address challenges arising from comparison of data from non-file accessing operations. While collecting data representative of inputs for non-file accessing operations may support a more accurate and useful comparison, the use of such data may result in unnecessary execution of build processes. For example, some environment variables, such as a folder or file path, or other data location, may be indicative of a user name or a name assigned to a computer. While such variables may change the output of the build process, use of the output of a previous execution of the build process may nonetheless be appropriate. The disclosed embodiments may be configured to address such environment variables by generating, for example, machine-agnostic or machine-independent representations of one or more inputs. Such machine-independent representations may then be compared with the similarly converted representations of such inputs from previous builds.

The use of such machine-independent representations may allow environment variables to be considered in the comparison without unduly restricting the use of previous outputs. For example, the output data from previous builds may thus be used by multiple developers. The builds by a team of developers may thus contribute to, and later use, a common cache of output data, the inputs for which are no longer indicative of the specific developer or machine from which the output data was generated. The disclosed embodiments may thus be configured to support multiple developer environments for a given software product by allowing any number of developers to utilize the data cached from previous builds.

In some embodiments, a configuration file or other configuration data is accessed to determine whether to attempt to optimize a particular build process. Optimization may be especially useful in connection with time intensive build processes. In contrast, some build processes may execute so quickly that the process of copying archived results from a previous execution of the build process may take as long as, or longer than, the execution time of the build process. The configuration data may be relied upon to exclude these and other build processes, such as those processes that do not behave deterministically. Deterministic processes are considered to be those processes that generate the same output each time the process is given the same set of inputs. However, some non-deterministic processes may be optimized by the disclosed embodiments. For example, certain types of output differences that are insignificant and/or non-substantive may be ignored in some cases, including, for instance, timestamps and globally unique identifiers (GUIDs).

Notwithstanding references herein to various build processes or tools, the disclosed embodiments are not limited to any particular type of build, build process, or build tool. For instance, builds in addition to source code builds may be optimized by the disclosed embodiments. For example, builds that perform a transformation of, e.g., binary files, may be optimized. The build optimization provided by the disclosed embodiments is not limited to a particular build engine or build framework. The disclosed embodiments are not limited to any specific operating system, environment, platform, or computing infrastructure. The nature of the software products processed via the disclosed embodiments may vary. For example, a software product need not involve a full or complete software application, such as an integrated software build released to production. Instead, the software product may involve a branch or other component of a software application or system. The disclosed embodiments may be used to build various types of software products, which are not limited to any particular operating system, operating or computing environment or platform, or source code language.

The disclosed embodiments are not limited to a particular type of build or build context. The data collected by the disclosed embodiments may, in fact, compare data indicative of the type of build or build context to more accurately determine whether to use the output of a previous build.

FIG. 1 depicts an environment 100 in which one or more software products under development are built. The environment 100 is a computing environment that may include one or more computers or computing systems (e.g., configured in a client-server arrangement). In this embodiment, the environment 100 includes a build system 102 configured to build a number of binary files, or binaries, from source code stored in a source code repository 104. The source code repository 104 may be integrated with the build system 102 to any desired extent. For instance, the source code repository 104 need not be a component of the build system 102 as shown. In some cases, the build system 102 obtains source code files from one or more source control services. The source code may be developed in connection with any type of source control system or framework. The source code may be written in any one or more languages.

The build system 102 or any component thereof may include a computer or computing system, examples of which are described below in connection with FIG. 3. The computer or computing system may be integrated with any one or more local repositories or data stores to any desired extent. The computer or computing system may include one or more processors or a processing system configured by instructions of one or more engines, tools, modules, or other units of the build system 102.

The build system 102 includes a build engine 106 having a number of build tools configured to compile and otherwise process the source code and other input data to generate and package the binaries. The build tools may be directed to a variety of different functions, including, for instance, source code compilation, resource compilation, linking, and resource generation. Any build engine, software, tool, and/or infrastructure may be used in the build system 102. In one example, the build system 102 utilizes the MSBuild build platform from Microsoft Corporation, which may be available via or in conjunction with the Microsoft® Visual Studio® integrated development environment. Other build systems and/or integrated development environments may be used. For example, the build system 102 may be provided or supported via a cloud or other networked computing arrangement, such as cloud-based system described in U.S. Patent Publication No. 2013/0055253 ("Cloud-based Build Service"), the entire disclosure of which is hereby incorporated by reference.

The build tools are provided via execution of a number of build processes 108. Each build process 108 may provide one or more build tools. Each build process 108 may include or be provided by an executable program to be run during the build. Examples of build processes 108 include native code compilers (e.g., cl.exe), linkers (e.g., link.exe), assemblers (e.g., ml.exe and ml64.exe), model generation processes (e.g., instancetool.exe), build engines (e.g., msbuild.exe), compilers of managed code (e.g., csc.exe), resource generators (e.g., rsgen.exe), and resource compilers (e.g., cvtres.exe). Additional, fewer, or alternative build tools may be provided by the build processes 108. A build may thus involve executing any number of such build processes 108. The build processes 108 may vary based on various characteristics of the environment 100, including, for instance, the operating system, the source code language(s), and various characteristics of the processor(s) or processing system of the environment 100, such as the processor architecture (e.g., 32-bit or 64-bit architectures). One or more of the above-referenced examples of build processes is configured for operation in an environment running one of the Microsoft® Windows® operating systems and processing source code written in, for instance, the C++ or C# programming languages. Other build processes may be used to provide such tools for other environments.

Some of the build processes 108 may be called or invoked by other build processes 108. For example, the compilation process csc.exe is often called as a descendant or child process of the process msbuild.exe. The build processes 108 may thus be executed in accordance with a tree or other dependency graph as shown in FIG. 1. A root or top level process of a build may call any number of child processes, each of which may, in turn, call other child processes. The dependency graph may thus have any number of levels. A build may have any number of root or top level build processes. The dependency graph may vary between builds. For instance, in some cases, a build process may be executed on its own in one build, and as a child process in another build. The disclosed embodiments are not limited to a particular arrangement of build processes 108, and are configured to implement a recording algorithm that automatically propagates through the arrangement to support optimization at each level, as described below.

Each build process 108 includes data access operations to obtain inputs. The inputs provide data to be processed by the build process 108. The respective instructions of each build process 108 may specify any number of data access operations of varying types. The data access operations may include or involve an application programming interface (API) operation or routine invoked during execution of the build process 108 to obtain input data. For example, one API operation directed to obtaining input files in a Microsoft® Windows® environment is the OpenFile API. One API operation directed to obtaining non-file input data is GetEnvironmentVariable to obtain current user or other environment variables, or RegOpenKeyEx to read from registry. The build processes 108 may invoke non-API operations to access data to be processed, such as reading from an input pipe or accessing configuration data.

The API or other data access operations invoked by the build processes 108 may be configured to obtain different types of input data. Some of the data access operations are file accessing operations configured to obtain one or more input files. The input files may be source code files 110 in the source code repository 104, but other types of input files may be obtained, such as binaries and resource files. The input files may include any type of data arranged in any type of language, structure, or framework. The location of the inputs may thus vary. For example, some inputs may be located in a registry.

Some of the data access operations invoked by the build processes 108 are non-file accessing operations. Non-file accessing operations are configured to obtain non-file input data, e.g., data provided in forms other than files. In the embodiment of FIG. 1, such non-file input data includes data representative of one or more parameters 112 of the environment 100, data representative of one or more configuration parameters 114 of the build system 102, and data presented to the build engine 106 as, for instance, arguments via a command line 116 or other user interface of the build system 102 or otherwise presented by the environment 100. The parameters 112 of the environment 100 may be indicative of a wide variety of characteristics of the environment 100, including, for example, a network location of the computer or computing system of the environment 100. The configuration parameters 114 of the build system 102 may be directed to customizing the operation of the build system 102 for a particular type of build (e.g., a debug build or a release build). The command line 116 may be used to specify any arguments or other parameters for one or more of the build processes 108. The arguments may be specified in connection with a command to initiate the build, initiate the execution of one or more of the build processes 108, and/or configure one or more aspects of the build, the build engine 106, and/or the build processes. In some cases, one or more of the configuration parameters 114 are specified via the command line 116, but may be specified or established in a variety of other ways.

Additional, fewer, or alternative types of non-file input data may be obtained via the non-file accessing operations of the build processes 108. For example, the non-file data may indicative of a user name. The non-file input data may also or alternatively include data representative of the name of a file or folder path, a directory, or other storage location within or relative to the environment 100. For example, the non-file input data may be representative of a file path 118 and/or a directory 120 of the source code repository 104, but other storage locations may be specified.

The non-file accessing operations may be configured to obtain various types of input data for the build processes 108. The input data may include one or more variables, parameters, codes, or other data elements. The arrangement, format, or other characteristics of the data elements may vary. For example, the data elements may be encoded. The configuration parameters 114 may include one or more codes representative of the build context, the type of build, or a development stage of the build (e.g., a debug build or a release build).

Execution of the build processes 108 by the build engine 106 generates a number of binary files 121 for the software product. In this example, the binary files 121 are stored in a build repository 122 of the environment 100. The results of a build may include output data in addition to the binary files 121.

The output data of a build may vary based on the inputs obtained by either the file accessing operations or the non-file accessing operations. The inputs obtained by these operations are thus collected and processed by an optimizer 124 of the build system 102 to support the possible re-use of past or previous output data in future builds. In this embodiment, the optimizer 124 is configured as a discrete component of the build system 102, but may be integrated with one or more other components or units of the build system 102 to any desired extent, including, for example, the build engine 106.

The optimizer 124 is operative to execute build optimizer instructions for each build process 108. The build optimizer instructions are configured to direct the collection of data representative of the inputs obtained by the data accessing operations implemented during execution of the build process 108. The build optimizer instructions are further configured to direct a comparison of such data with data representative of the inputs obtained in connection with a subsequent execution of the build process 108. The optimizer 124 is configured to utilize a redirection tool 126 configured to embed or incorporate a hook or other redirection routine into each build process 108 for execution upon invocation of each data access operation within the build process 108. Each time the build process 108 attempts to obtain an input (e.g., via a file accessing operation or via a non-file accessing operation), the redirection tool 126 implements the redirection routine to allow the input to be captured by the optimizer 124.

In some embodiments, the redirection tool 126 may use the Microsoft® Detours software tool from Microsoft Corporation. The Detours software tool includes a library for instrumenting various functions on computers or computing systems running one of the Microsoft® Windows® operating system. The Detours software tool may intercept the functions by re-writing target function images. The Detours software tool may be used to hook file access and non-file access API and other operations to track what the functions do. The Detours software tool may provide a technique for inserting the collection functionality of the optimizer 124 between the build process 108 and the operating system. Other software tools may be used to implement the redirection tool 126, including, for example, the Drawbridge and other virtualization tools available from Microsoft Corporation and described at http://research.microsoft.com/en-us/projects/drawbridge/ and http://www.microsoft.com/en-us/windows/enterprise/products-and-technologies/virtualization/app-v.aspx. Further details regarding the use of a tracking tool, such as the Detours software tool, during a build are set forth in U.S. Pat. No. 7,721,272 ("Tracking File Access Patterns During a Software Build") and U.S. Patent Publication No. 2012/0260240 ("Software Build Optimization"), the entire disclosures of which are hereby incorporated by reference.

The optimizer 124 may include or access one or more units, instructions, or modules configured to generate or determine an identification code or other identifier for the captured inputs. The identifier may then be used to more efficiently perform the comparison with the input data obtained during a previous execution of the build process 108. In the embodiment of FIG. 1, the optimizer 124 includes a hash calculator 128 to determine a hash code for each respective captured input. The hash code is generated based on the content data of the input. For example, the entire contents of a file are read and fed into the hash calculator 128. If the content data changes between executions of the build process 108, the changes are reflected in different hash codes.

A variety of different hash algorithms may be used by the hash calculator 128. In some embodiments, the SHA-1 hashing algorithm is used. Other embodiments may use the MD5 hashing algorithm.

The identification code of each input may correspond with the hash code or the hash code in combination with other data. For example, the hash code may be combined with file path data to form an identifier for each file input. Other types of data may be combined with the hash code.

The hash calculator 128 may also be used to generate a hash code to serve as an identifier for each build process 108. The optimizer 124 may use such identifiers to more efficiently determine whether a particular one of the build processes 108 has been previously executed and, thus, has had input data recorded (and output data stored) to support a comparison, as described below.

Alternatively or additionally, the optimizer 124 may rely on a file system tool 130 to determine an identifier for the captured inputs. In some cases, the file system tool 130 is provided as a component of the file system and/or operating system of the environment 100. The file system tool 130 is configured to generate a versioning string that uniquely identifies each version of a file stored within the file system. The optimizer 124 may access the file system to determine an identifier based on the versioning string, and then use the identifier in a comparison with the identifiers of previous executions. In some cases, the file system tool 130 may be or include a journaling feature of the file system or operating system, such as the journaling tool of the NTFS file system of the Microsoft® Windows® operating systems. Such journaling tools provide a unique sequence number (USN) for each file. In some embodiments, the file system may provide the USN as well as a hash or other identifier of each file.

The USN or other identifier generated by the file system tool 130 may be used in combination with the hash calculator 128. For example, the optimizer 124 may check to see if the USN value of an input has changed, and only calculate a hash code if the USN does not match one of the previous USN values. A database or other table may be accessed that maps the USN values to the hash codes, examples of which are described below.

In some embodiments, identifiers are determined for each captured input. Alternatively, identifiers are determined for each file input, while non-file input data may be represented by other data, such as the non-file input data itself or other metadata representative of the non-file input data.

The determination of the identifiers may include a conversion or preprocessing of the input data before, for instance, calculation of the hash code. In the embodiment of FIG. 1, the optimizer 124 includes a converter 132 to determine a machine-agnostic or machine-independent representation of one or more of the inputs. The machine-independent representation may then be processed by the hash calculator 128 or other code determination module, unit, or instructions. In a non-file input example in which the input data is representative of an environment variable such as a path name, the converter 132 is configured as or includes a path converter to remove the portion of the path specific to the computer or machine of the environment 100, thereby leaving those portions of the path name that are generic to each installation of the build system 102. The converter 132 may be configured as or include other types of converters or other normalization units directed to generalizing, genericizing, or otherwise normalizing other environment variables or build configuration parameters. Such normalization may also be used to remove non-deterministic aspects of the output data, including randomization as described below. The data conversion may thus vary from the path-based example described above. Other example conversions may involve the removal of user names, machine names, build versions (e.g., if the build version is automatically incremented), and temporary file names (which may be replaced with machine/invocation-agnostic tokens).

The machine-independent representations may be useful in supporting development teams in which multiple users and, thus, multiple computers, are initiating builds of the software product. Without the conversion of the input data to a machine-independent representation, the comparison of the input data of the current and previous executions of the build process 108 would indicate that the input data is different. The build process 108 would then be executed despite that the non-substantive difference in the input data. Instead, with the conversion of the input data, the builds may thus be optimized via the disclosed embodiments regardless of which developer (or computer or machine) or instance of the build system 102 or the environment 100 initiates the build. The machine-independent representation data and other data recorded and stored by the optimizer 124 may be provided to a networked data store accessible by, and in communication with, the entire development team.

In the embodiment of FIG. 1, the optimizer 124 includes a control unit or controller 134 to implement the comparison and subsequent decision logic to determine whether the build process 108 is re-run in connection with a subsequent request to execute the build process. The redirection tool 126 may include a function call or other reference to the controller 134 to direct the controller 134 to process the input data captured during the execution of the build process 108. Alternatively or additionally, the comparison and/or the decision logic of the controller 134 is incorporated into or handled by the code of the redirection tool 126. Either way, the comparison and the decision logic are implemented in connection with the request for the execution of the build process 108. The request may be user-initiated or automatically initiated (e.g., via a call or other reference to any build process involved within the build, such as within another build process).

The controller 134 may also be configured to obtain the input data for the build process 108 without relying on the redirection tool 126 once the inputs for the build process 108 are known. Given the identifier of the build process 108, the controller 134 may determine the inputs to be used for the comparison based on the data previously recorded for the build process 108. In other embodiments, any other unit, module, or instructions of the optimizer 124 may be used to determine and obtain the inputs for the build process 108 when known.

The controller 134 compares the identification code, identifier, or other data representative of the inputs captured via the redirection tool 126 (e.g., the current input identifier data) with the data representative of the inputs obtained in connection with one or more previous executions of the build process 108 (e.g., the past input identifier data). If the current input identifier data does not match any instance of the past input identifier data, the build process 108 is executed. The resulting output data generated by the build process 108 based on the current set of inputs is archived, cached, or otherwise stored for possible re-use in a future execution of the build process. Such storage may be in addition to storage in the build repository 122 as an output of the build process 108. The controller 134 also directs a recorder 136 to record the current input identifier data in a data store 138. The current input identifier data may be stored in association with the hash code or other identifier of the build process 108. The identifier of the build process 108 may be used as an index to the past input identifier data.

The output data may also be stored by the controller 134 and/or the recorder 136 in the data store 138. For example, the output data may be stored in a table in association with the current input identifier data. Alternatively, the output data is archived in a data store separate from the data store 138, such as the build repository 122. The output data may include data other than binaries or binary files. For example, the build processes 108 may generate return codes, output streams, and other types of output data. Such non-file outputs may be stored in the database of the data store 138 within the identity record of the current execution of the build process as metadata of the current execution.

If the current input identifier data matches an instance of the past input identifier data, the output data generated by the previous execution of the build process (i.e., in response to the matching past input identifier data) is used as an output of the build process 108 and the build in lieu of re-running or re-executing or otherwise proceeding with the execution of the build process. In the embodiment of FIG. 1, the controller 134 may access the data store 138 or other data store in which the past output data is archived or otherwise stored to obtain the past output data. The past output data may then be copied by the controller 134 to the appropriate location in the build repository 122 (e.g., the location into which the build process 108 would otherwise have stored the output data during execution).

The data store 138 may be a local data store of the environment 100 for a particular instance of the build system 102. For example, the data store 138 may include a database configured for access by the build system 102, but other configurations, data structures, and arrangements may be used. For example, non-database stores may be used, including, for instance, local storage next to the source code and/or non-database systems, such as the Windows Azure™ Tables storage system. The identifiers (e.g., hash codes) of the build process 108 and its inputs may be stored as metadata in the database. Such metadata may thus be stored separately from the output data (e.g., binaries and return codes). In other embodiments, the metadata and the output data are stored in a common data store. The recorder 136 or other component of the optimizer 124 may include or utilize the Microsoft® SQL Server® database management system from Microsoft Corporation, but other database management systems may be used. For example, the SQL Azure™ database management system from Microsoft Corporation may be used, but other database management systems or data store architectures may be used. Hosted services other than the Windows Azure™ hosted service may alternatively be used.

To support comparisons with the past input identifier data of multiple developers or multiple build machines, the database of the data store 138 may be replicated to a cloud data store 140 or other networked data store via an internet or other network connection 142. The replication may be directed or implemented by the recorder 136 or other component of the optimizer 124. Alternatively, the data store 138 may be configured for automated replication. The cloud data store 140 may use the Windows Azure™ hosted service, but other services may be used.

To support the capture and comparison of input data for multiple levels of build processes 108, the redirection tool 126 or other redirection tool instructions are injected into each child process called by the build process 108 during execution of the build process 108. The modules, units, or other instructions of the optimizer 124 may thus be recursively implemented to cover a tree or dependency graph group of build processes 108. The redirection tool instructions may be added to the root or top level node of the tree (e.g., during an initial, pre-build configuration), and be operative for replication in each child process invoked therein.

The recorder 136 may be configured to aggregate the input identifier data for each tree of build processes 108 so that the comparison may be a collective comparison. The inputs for which identifier data is compared may thus correspond with the union of all external inputs of the individual build processes 108 invoked in the tree. The aggregation of the input identifier data may include the exclusion of any intermediate or non-external inputs. For example, an output of one of the build processes 108 in the tree may constitute an input to another one of the build processes 108. Such shared input/ output data may be excluded from the aggregation. In cases where one of the external inputs is modified during the execution of the tree, the recorder 136 may be configured to capture the initial state of such inputs and disregard the modified state. In these and other cases, the recorder 136 may capture data indicative of the order (or rough order) in which the build processes 108 of the tree are executed.

In some embodiments, the build system 102 is configured such that the above-described optimization is implemented for only some of the build processes 108. Only a subset of the root or top-level nodes of a tree of build processes 108 may be suitable for optimization. For example, because a root of one tree may correspond with just a node or portion of another, larger tree, an intermediate or partial optimization may involve the smaller tree rather than the entire, larger tree. Other partial optimizations may target the build processes 108 deemed to be sufficiently costly (e.g., in execution time) to warrant the application of the optimization technique. For example, certain types of compilation and linking processes may be sufficiently time-intensive to warrant the above-described archiving and subsequent comparisons. On the other hand, a developer may elect not to optimize other build processes 108 having a relatively quick execution time. For example, some build processes 108 that mainly involve a file copy operation may be more quickly executed than the optimization routine (which may also involve a file copy). These build processes 108 may be excluded from processing for possible optimization by a configuration list 144. For example, the configuration list 144 may set forth the excluded processes in an extensive markup language (XML) document. Other data structures or files may be used. The configuration list 144 may alternatively or additionally identify build processes to be included. The entries in the configuration list 144 may be based on historical or empirical data collected in previous builds.

The configuration list 144 may be accessed by the optimizer 124 during operation. For example, the optimizer 124 may consult the configuration list 144 to determine whether to check the data store 138 (or the data store 140) to see whether data has been stored for the current build process 108. As a result, a child process within a tree may be excluded from the processing. Alternatively or additionally, the redirection tool 126 or other redirection or optimizer instructions may be configured to consult the configuration list 144 prior to injecting the redirection instructions into a child process.

The configuration list 144 may also be used to exclude non-deterministic processes. For example, processes that introduce randomization into the build output data may be excluded. The configuration list 144 may rely on or incorporate expert knowledge or other information regarding how the randomization introduced by one build process may lead to further randomization of outputs from other build processes. In an alternative embodiment, the disclosed embodiments may include one or more normalization tools to remove such randomization in an input conversion and/or via a normalization of the output. Other types of build processes may also be excluded, including, for instance, those utilizing input/output pipes and others not well suited for the above-referenced redirection techniques.

Figure 2:
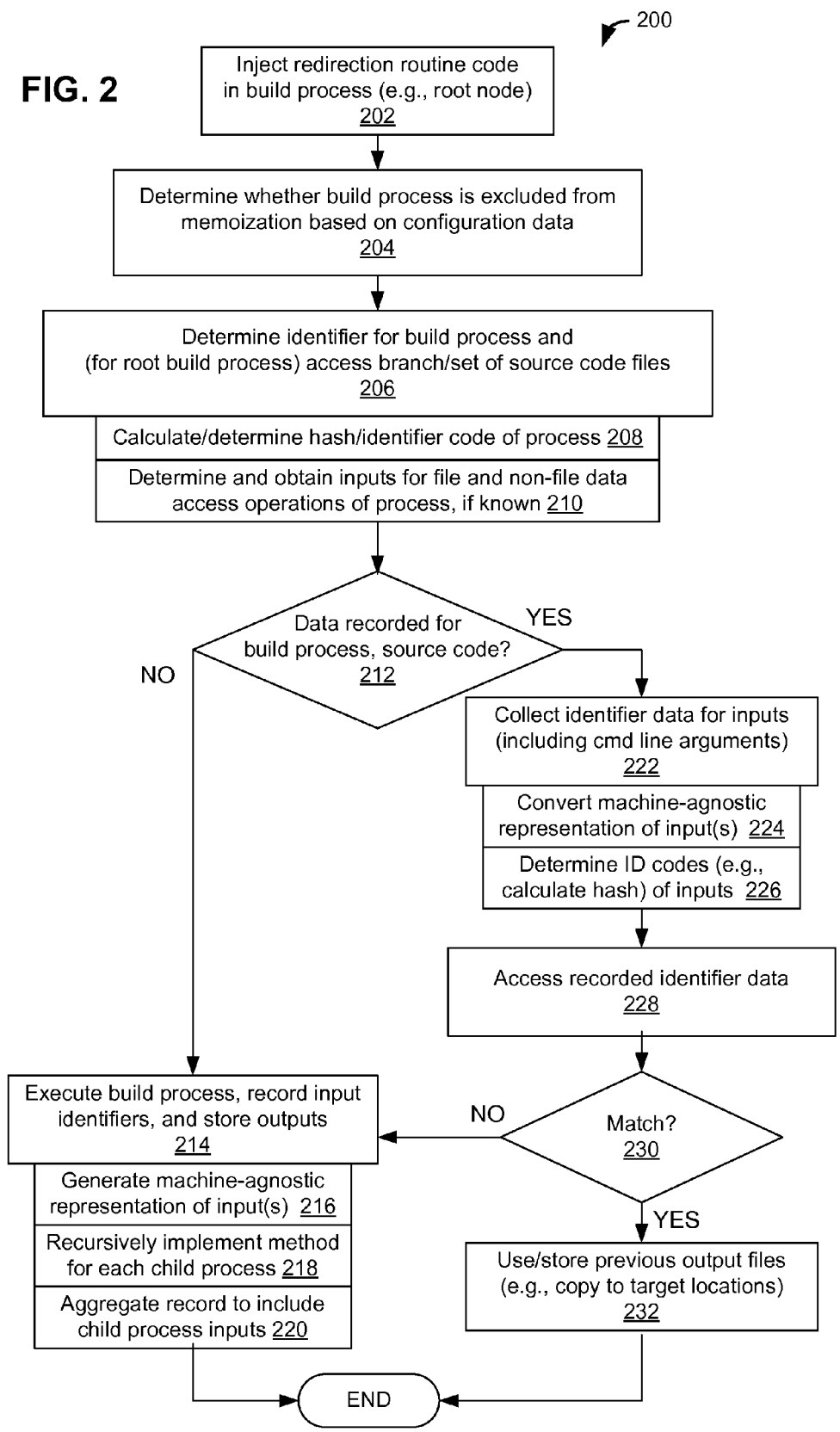
FIG. 2 is a flow diagram of an exemplary computer-implemented method for optimization of a software build in accordance with one embodiment.

FIG. 2 depicts an exemplary method 200 for optimization of a source code build. The method is computer-implemented. For example, one or more computers of the build system 102 shown in FIG. 1 may be configured to implement the method or a portion thereof. The implementation of each act may be directed by respective computer-readable instructions executed by a processor of the build system 102 and/or another processor or processing system. Additional, fewer, or alternative acts may be included in the method. For example, the method 200 need not include a determination of whether a build process (e.g., one of the build processes 108 of FIG. 1) is excluded.

The method 200 may begin with one or more acts related to receipt of a request to initiate a build of a software product or to execute a build process. For example, a user may access a user interface generated by the build system 102 (FIG. 1) to submit the request. Alternatively, the method may be initiated or triggered automatically by an event, such as a check-in of one or more source code files. The method need not be initiated by a user request. For example, the method may be initiated by a service or other computing system. In some embodiments, a number of the acts described below may be implemented before the initiation of the build. For example, an invocation of a CreateProcess process may be redirected to implement one or more acts of the method 200, including, for instance, the acts described below in connection injection of redirection routine code, exclusion analysis, and identification of the build process(es).

In the embodiment of FIG. 2, the method 200 begins with an act 202 in which redirection routine code or instructions are injected or otherwise incorporated into a build process. The build process may be a root or top level node of a tree of build processes. In other cases, the root build process is already configured with the redirection routine code. Once the redirection instructions are present in the root node, the implementation of the method 200 may be repeated for any number of build process trees.

In an act 204, a determination is made as to whether the current build process is excluded from the memorization or optimization. The determination may be made based on configuration data, such as the data provided via the configuration list 144 (FIG. 1). The act 204 may not be implemented in some cases, e.g., the root node of the tree. Even if the current process is excluded, one or more child processes invoked by the current build process may not be excluded. So the exclusion of the current process may involve continuing the implementation of the method 200 so that the recursion functionality described below in connection with the act 218 is implemented to process (e.g., inject redirection code, implement comparison, etc.) any child processes.

If the current build process is not excluded or is otherwise subject to optimization, an identifier for the build process may be determined in an act 206. The identifier may be a hash or other identification code generated in an act 208 based on the content (e.g., binary data) of the build process. The act 208 may be implemented before initiation of the build. The hash or other identifier may be used as a preliminary check to determine whether the current build process has been executed yet and, thus, whether any past build output data may be available for re-use.

In some cases, the act 206 may alternatively or additionally implement another preliminary check to determine whether any past build output data may be available. In the embodiment of FIG. 2, the act 206 includes accessing or identifying a branch or other set of source code files to be processed by the build process. The branch of a software product may be specified via a command line or other input argument or configuration parameter of the build. The identification of the branch may be used to determine whether any of the build processes have been executed yet. The preliminary check may be used, in some embodiments, to avoid implementation of the hash algorithm for one or more build processes. For example, once the preliminary check indicates that the branch has yet to be processed, the method may proceed to a recording mode for all build processes invoked in the build. In an alternative embodiment, the act 206 may be configured to consider two or more branches collectively, if, for instance, the different branches contain similar code. The disclosed embodiments may thus be applied across multiple branches in some cases.

For known (e.g., previously executed) build processes, the inputs for the data accessing operations of the build process may be determined and obtained in an act 210. During a first execution of the build process, the inputs may not yet be known due to, for instance, a number of data accessing operations implemented in child processes invoked by the current build process or because the current build process was recently started.

The identifier of the current build process may then be compared in a decision block 212 with the data stored in a database or other recorded data, such as the data store 138, to determine whether any data is available from one or more past executions of the build process. If the build process is being executed for the first time, then data will have yet to be recorded. Alternatively or additionally, the decision block 212 may determine whether any data has been recorded for the branch or other set of source code being processed.

If data has yet to be recorded for either the build process, then control passes to an act 214 in which the current build process is executed and the output is stored for possible subsequent use. The output data may be stored locally in, e.g., a data store such as the data store 138 (FIG. 1) and/or a remote data store, such as the cloud data store 140 (FIG. 1). During the execution of the build process, the inputs for the build process are captured via a redirection routine, as described above. The nature of the data accessing operations to obtain the inputs may vary, as described above. The inputs for both file and non-file accessing operations are captured. The data indicative of each captured input may then be processed as described above to generate an identifier to be used in subsequent comparisons. For example, in some cases, a hash or other identification code is calculated or determined, as described above. Such calculations may be preceded by a conversion in an act 216 to generate a machine-independent representation of the input data, as described above.

As child processes are invoked during execution of the build process, the method 200 may be recursively implemented in accordance with an act 218. For each child process invoked or otherwise called during execution of the build process, redirection instructions are injected or incorporated into the child process in connection with the act 202. The redirection instructions include instructions for such automated incorporation. The redirection instructions may thus support the processing of an entire dependency graph or tree of build processes based on the addition of code to only the root or top level node of the tree. As the method 200 is implemented for each level of the tree, the input identifiers for the input data are aggregated in an act 220 for each child process and the build process. The input identifiers for the build process may thus be representative of a collective set of inputs for the build process and any child processes invoked thereby. In other cases, one or more child processes are not deterministic or otherwise excluded, in which case the collective set of inputs does not cover every one of the child processes.

If data has been recorded for the build process and the particular branch of source code, then control passes to an act 222 in which identifier data is collected for the inputs of the build process. The input collection may include data capture via the redirection tool, as described above. Alternatively, the inputs may be obtained by determining which inputs are used by the build process. In some cases, the determination has already been made in connection with the act 210. The determination may include a database query to identify the inputs for the build process. Once the input data is collected or otherwise obtained, conversions to machine-independent representations of the input data may be implemented in an act 224, and hash codes or other identifiers determined in an act 226. In some cases, a conversion from specific (e.g., local) representations to machine-independent representations may be implemented for the current execution of the build process. Another conversion in the opposite direction (e.g., from a generic path to a specific, local path) may be implemented on the past input data to support, for example, finding the input files for the current execution.

A database, such as the data store 138 (FIG. 1) is then accessed in an act 228 to support the comparison of the identifiers with those of previous executions of the build process. Alternatively or additionally, the act 228 includes obtaining data from a remote or networked data store, such as the cloud data store 140 (FIG. 1). Such data may include the output data generated from additional executions of the build process initiated by, for instance, other users or build machines. The data from the networked data store may be synchronized, pre-populated (e.g., before initiation of the build), or otherwise incorporated into the data store 138 for use in the comparison. In some cases, such synchronization or incorporation may be implemented earlier, including, for instance, before the initiation of the build or as an initial step of the method 200. The database may be queried to determine whether a record or entry exists that matches the identifiers. If a match is not found, then a decision block 230 passes control to the act 214 for execution of the build process and recordation of the input identifiers as described above. The input identifiers (including, e.g., hash codes) may already be determined in connection with the act 226. If a match is found, control passes to an act 232 in which the output data generated by the previous execution of the build process is used as the output of the current execution of the build process. Because the inputs for the previous execution match those of the current execution, the previous outputs may be used in lieu of re-running or re-executing or otherwise proceeding with the execution of the build process. The previous outputs may match the outputs that would have been generated if the build process were allowed to execute. In some embodiments, a process may be provided to generate an exit code for the current execution of the build process. The exit code may mimic the exit code of the matched, previous execution of the build process, and may satisfy an expectation from a parent process that called the current process.

The method 200 may include one or more acts directed to recording an indication of those files that were not found despite an attempt to access such files. For example, if the attempt to access the recorded identifier data in the act 228 fails, the record subsequently created by virtue of the execution of the build process in the act 214 may include an indication that certain files were not found or accessible.

The order of the acts of the method may vary from the example shown. For example, in some embodiments, a hash algorithm is implemented for the build processes, source code files, or other inputs, before initiating the execution of the build. Such pre-calculation of the hash codes may improve the performance of the optimizer. In some embodiments, the pre-calculation may be implemented as part of a synchronization procedure in which, for example, source code, binaries, or other inputs are retrieved from a local repository. The synchronization procedure may alternatively or additionally include the retrieval of data from a networked data store, such as the cloud data store 140 (FIG. 1) to update or provide data stored locally.

Figure 3:
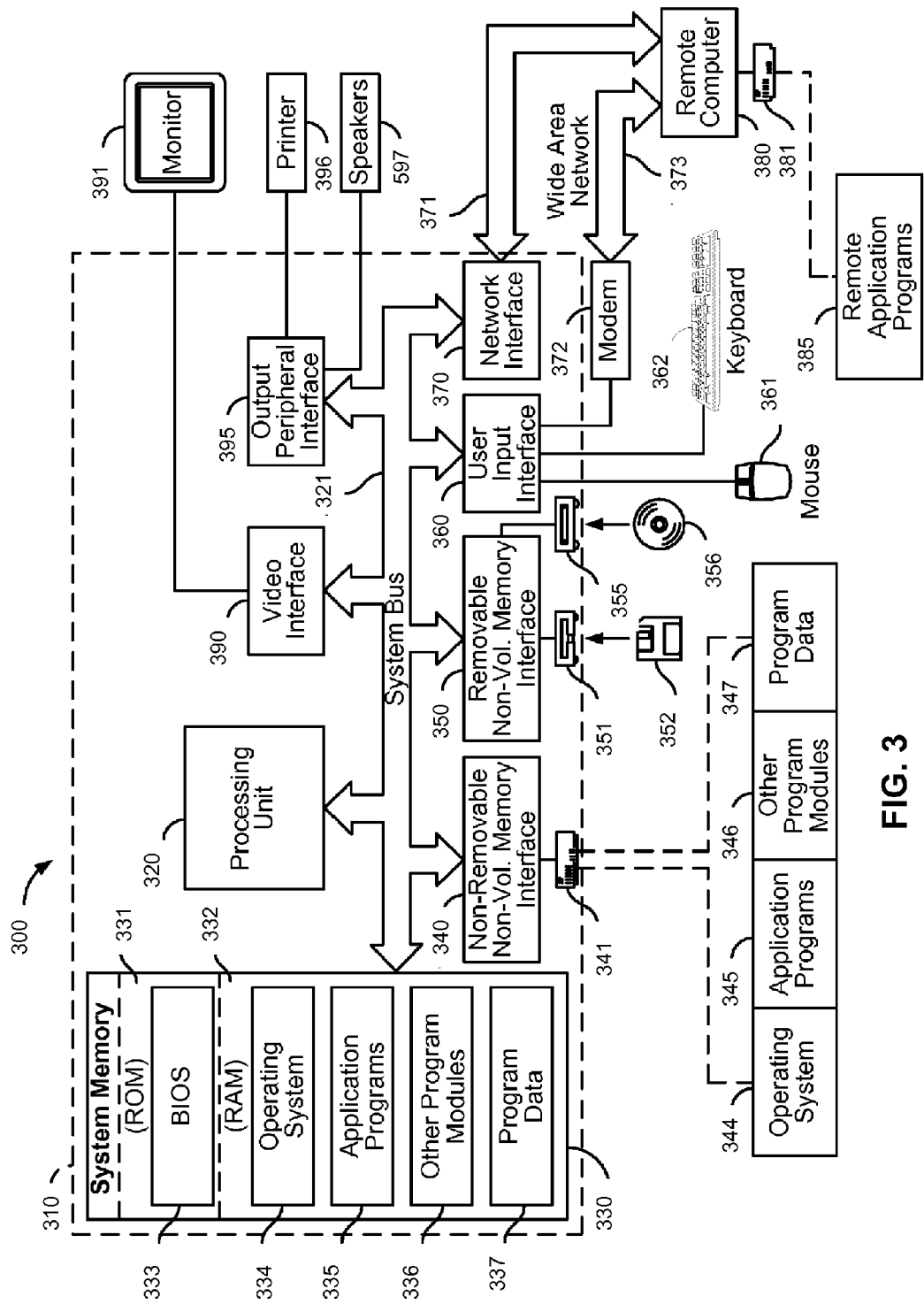
FIG. 3 is a block diagram of a computing environment in accordance with one embodiment for implementation of the disclosed methods and systems or one or more components or aspects thereof.

With reference to FIG. 3, an exemplary computing environment 300 may be used to implement one or more aspects or elements of the above-described methods and/or systems. The computing environment 300 may be used by, incorporated into, or correspond with, the environment 100 (FIG. 1) or one or more elements thereof. For example, the computing environment 300 may be used to implement the build system 102 (FIG. 1), the build engine 106, the optimizer 124, or other component of the build system 102. The computing environment 300 may be used or included as a client, network server, application server, or database management system or other data store manager, of any of the aforementioned elements or system components. The computing environment 300 may be used to implement one or more of the acts described in connection with FIG. 2.

The computing environment 300 includes a general-purpose computing device in the form of a computer 310. Components of computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The units, components, and other hardware of computer 310 may vary from the example shown.

Computer 310 typically includes a variety of computer readable storage media configured to store instructions and other data. Such computer readable storage media may be any available media that may be accessed by computer 310 and includes both volatile and nonvolatile media, removable and non-removable media. Such computer readable storage media may include computer storage media as distinguished from communication media. Computer storage media may include both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may accessed by computer 310.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 3 illustrates operating system 334, application programs 335, other program modules 336, and program data 337. For example, one or more of the application programs 335 may be directed to implementing one or more modules or other components of the build system 102, the build engine 106, the optimizer 124, and/or any instruction sets of the systems and methods described above. In this or another example, any one or more the instruction sets in the above-described memories or data storage devices may be stored as program data 337.

Any one or more of the operating system 334, the application programs 335, the other program modules 336, and the program data 337 may be stored on, and implemented via, a system on a chip (SOC). Any of the above-described modules may be implemented via one or more SOC devices. The extent to which the above-described modules are integrated in a SOC or other device may vary.

The computer 310 may also include other removable/non-removable, volatile/nonvolatile computer storage media. By way of example only, FIG. 3 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media discussed above and illustrated in FIG. 3, provide storage of computer readable instructions, data structures, program modules and other data for the computer 310. For example, hard disk drive 341 is illustrated as storing operating system 344, application programs 345, other program modules 346, and program data 347. These components may either be the same as or different from operating system 334, application programs 335, other program modules 336, and program data 337. Operating system 344, application programs 345, other program modules 346, and program data 347 are given different numbers here to illustrate that, at a minimum, they are different copies. In some cases, a user may enter commands and information into the computer 310 through input devices such as a keyboard 362 and pointing device 361, commonly referred to as a mouse, trackball or touch pad. Other input devices (not shown) may include a microphone (e.g., for voice control), touchscreen (e.g., for touch-based gestures and other movements), ranger sensor or other camera (e.g., for gestures and other movements), joystick, game pad, satellite dish, and scanner. These and other input devices are often connected to the processing unit 320 through a user input interface 360 that is coupled to the system bus, but may be connected by other interface and bus structures, such as a parallel port, game port or a universal serial bus (USB). In some cases, a monitor 391 or other type of display device is also connected to the system bus 321 via an interface, such as a video interface 390. In addition to the monitor, computers may also include other peripheral output devices such as printer 396 and speakers 397, which may be connected through an output peripheral interface 395.

The computer 310 may operate in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 3. The logical connections include a local area network (LAN) 371 and a wide area network (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer 310, or portions thereof, may be stored in the remote memory storage device. FIG. 3 illustrates remote application programs 385 as residing on memory device 381. The network connections shown are exemplary and other means of establishing a communications link between the computers may be used.

The computing environment 300 of FIG. 3 is only one example of a suitable computing environment and is not intended to suggest any limitation as to the scope of use or functionality of the technology herein. Neither should the computing environment 300 be interpreted as having any dependency or requirement relating to any one or combination of components illustrated in the exemplary operating environment 300.

The technology described herein is operational with numerous other general purpose or special purpose computing system environments or configurations. Examples of well-known computing systems, environments, and/or configurations that may be suitable for use with the technology herein include, but are not limited to, personal computers, server computers (including server-client architectures), hand-held or laptop devices, mobile phones or devices, multiprocessor systems, microprocessor-based systems, set top boxes, programmable consumer electronics, network PCs, minicomputers, mainframe computers, distributed computing environments that include any of the above systems or devices, and the like.

The technology herein may be described in the general context of computer-executable instructions, such as program modules, being executed by a computer. Generally, program modules include routines, programs, objects, components, data structures, and so forth that perform particular tasks or implement particular abstract data types. The technology herein may also be practiced in distributed computing environments where tasks are performed by remote processing devices that are linked through a communications network. In a distributed computing environment, program modules may be located in both local and remote computer storage media including memory storage devices.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding only, and no unnecessary limitations should be understood therefrom, as modifications within the scope of the invention may be apparent to those having ordinary skill in the art.

What is claimed is:

1. A computer-implemented method for optimization of a software build, the computer-implemented method comprising:
    collecting first data representative of a plurality of inputs for a build process of the software build, the plurality of inputs being obtained by a set of data accessing operations implemented during a first execution of the build process, the set comprising a file accessing operation and a non-file accessing operation, wherein collecting the first data comprises capturing the plurality of inputs via a redirection routine embedded within the build process for execution upon invocation of the file and non-file accessing operations;
    comparing the first data with second data, the second data being representative of the plurality of inputs obtained in connection with a request for a second execution of the build process;
    if the first data and the second data do not match, recording the second data in a data store and storing output data generated by the second execution of the build process;
    if the first data and the second data match, using output data generated by the first execution of the build process as an output for the second execution of the build process in lieu of proceeding with the second execution of the build process;
    injecting the redirection routine into a child process;
    recursively implementing the collecting, comparing, recording, and using acts with the child process as the build process; and
    aggregating input identifier data for the child process and the build process;
    wherein aggregating the input identifier data comprises excluding from aggregation the input identifier data of a non-external input for the child process.

2. The computer-implemented method of claim 1, wherein the set of data accessing operations comprises a non-file accessing operation directed to obtaining a variable of a computing environment in which the software build is executed.

3. The computer-implemented method of claim 1, further comprising storing the output data generated by the first execution of the build process in a networked data store.

4. The computer-implemented method of claim 1, further comprising accessing a networked data store to obtain output data generated by a third execution of the build process.

5. The computer-implemented method of claim 1, wherein the set of data accessing operations comprises a non-file accessing operation directed to determining a software build configuration parameter specified via an argument in a command line invocation of the build process.

6. The computer-implemented method of claim 1, wherein collecting the first data comprises determining an identification code for each input of the plurality of inputs.

7. The computer-implemented method of claim 6, wherein determining the identification code comprises calculating a hash code based on content data of each input.

8. The computer-implemented method of claim 1, wherein:
    collecting the first data comprises generating a machine-independent representation of one of the plurality of inputs; and
    the data store comprises a networked data store in communication with a plurality of computers configured to initiate the software build; and generating the machine-independent representation of the respective input comprises removing from the respective input a portion of a path name specific to a respective computer of the plurality of computers.

9. The computer-implemented method of claim 1, further comprising determining whether configuration data for the build process indicates that the build process is to be excluded from collecting and comparing the first data.

10. A build system comprising:
a memory in which build engine instructions, redirection tool instructions, and build optimizer instructions are stored; and
a processor coupled to the memory and configured to execute the build engine instructions to execute a build process of a software build, the build process specifying a set of data accessing operations implemented during a first execution of the build process to obtain a plurality of inputs, the set comprising a file accessing operation and a non-file accessing operation;
wherein the build engine instructions are further configured to invoke the redirection tool instructions in connection with each data accessing operation of the set of data accessing operations, the redirection tool instructions being configured to cause the processor to capture the plurality of inputs for processing in accordance with the build optimizer instructions;
wherein the processor is further configured to execute the build optimizer instructions to:
compare first data representative of the captured plurality of inputs with second data, the second data being representative of the plurality of inputs obtained in connection with a request for a second execution of the build process;
if the first data and the second data do not match, record the second data in a data store and store output data generated by the second execution of the build process;
if the first data and the second data match, use output data generated by the first execution of the build process as an output for the second execution of the build process in lieu of proceeding with the second execution of the build process; and
inject the redirection tool instructions into one or more child processes of the build process; and
wherein the redirection tool instructions are further configured to cause the processor to aggregate input identifier data of each child process of the build process, and
wherein the build engine instructions are configured to:
recursively implement the build optimizer instructions in connection with the child process; and
exclude from aggregation the input identifier data of a non-external input for a respective one of the child processes of the build process.

11. The build system of claim 10, wherein the set of data accessing operations comprises a non-file accessing operation directed to determining a configuration parameter of the software build.

12. The build system of claim 10, wherein the build optimizer instructions are configured to cause the processor to normalize the output data generated by the first execution of the build process.

13. The build system of claim 10, wherein the build optimizer instructions are configured to cause the processor to store output data in the data store for a third execution of the build process obtained from a networked data store.

14. The build system of claim 10, wherein the set of data accessing operations comprises a non-file data access operation directed to determining a software build configuration parameter specified via an argument in a command line invocation of the build process.

15. The build system of claim 10, wherein the build optimizer instructions comprise an identification code determination module having instructions configured to cause the processor to determine an identification code for each input of the plurality of inputs.

16. The build system of claim 15, wherein the identification code determination module comprises hash calculator instructions configured to cause the processor to calculate a hash code based on content data of each input.

17. The build system of claim 10, wherein:
the build optimizer instructions comprise a path converter configured to cause the processor to determine a machine-independent representation of one of the plurality of inputs; and
the data store comprises a networked data store in communication with a plurality of computers configured to initiate the software build, a respective computer of the plurality of computers comprising the processor; and
the build optimizer instructions are configured to cause the processor to remove from the respective input a portion of a path name specific to the respective computer.

18. A computer program product for software build optimization of a software build, the computer program product comprising one or more computer-readable storage media having stored thereon computer-executable instructions that, when executed by one or more processors of a computing system, cause the computing system to perform the method, the method comprising:
collecting first data representative of a plurality of inputs for a build process of the software build, the plurality of inputs being obtained by a set of data accessing operations implemented during a first execution of the build process, the set comprising a file accessing operation and a non-file accessing operation, wherein collecting the first data comprises capturing the plurality of inputs via a redirection routine embedded within the build process for execution upon invocation of the file and non-file accessing operations;
comparing the first data with second data, the second data being representative of the plurality of inputs obtained in connection with a request for a second execution of the build process;
if the first data and the second data do not match, recording the first data in a data store and storing output data generated by the second execution of the build process;
if the first data and the second data match, using output data generated by the first execution of the build process as an output for the second execution of the build process in lieu of proceeding with the second execution of the build process; and
injecting the redirection routine into one or more child processes of the build process;
wherein the set of data accessing operations comprises a non-file accessing operation directed to obtaining a variable of an environment in which the software build is executed;
wherein collecting the first data comprises generating a machine-independent representation of a respective input of the plurality of inputs; and
wherein capturing the plurality of inputs comprises aggregating input identifier data of each child process of the build process and excluding from aggregation the input identifier data of a non-external input for a respective one of the child processes of the build process.

* * * * *